June 18, 1957
J. HEINEN ET AL
2,795,960
VALVE ACTUATING MEANS
Filed May 24, 1954
4 Sheets-Sheet 1
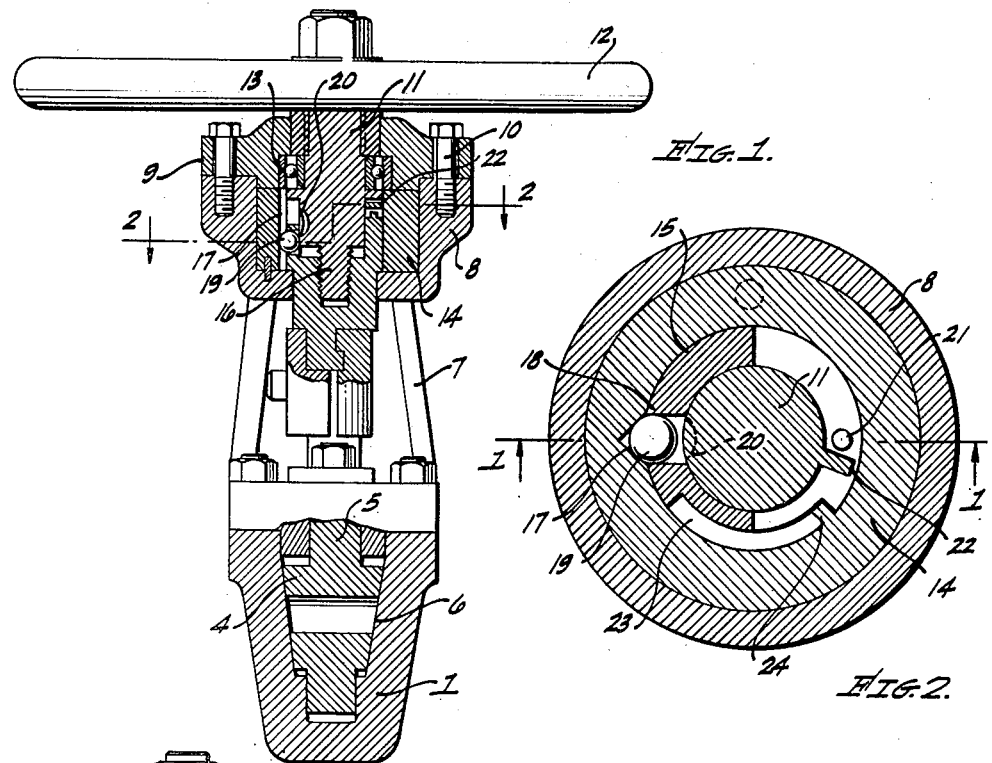
FIG. 1.
FIG. 2.
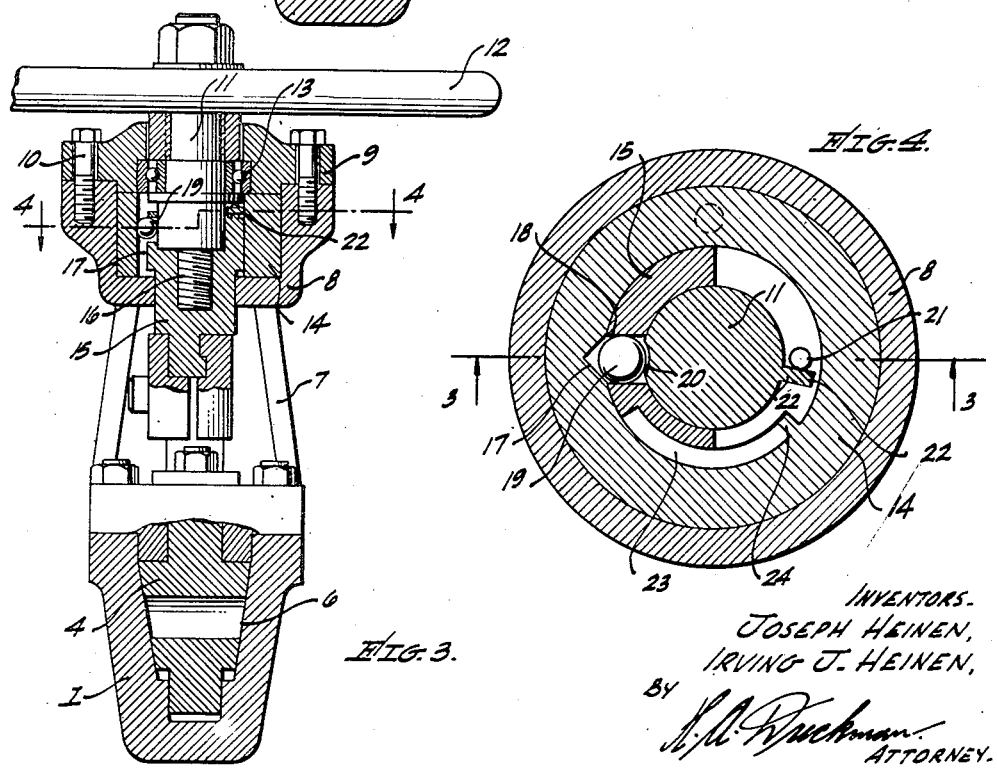
FIG. 3.
FIG. 4.
INVENTORS.
JOSEPH HEINEN,
IRVING J. HEINEN,
BY
ATTORNEY.

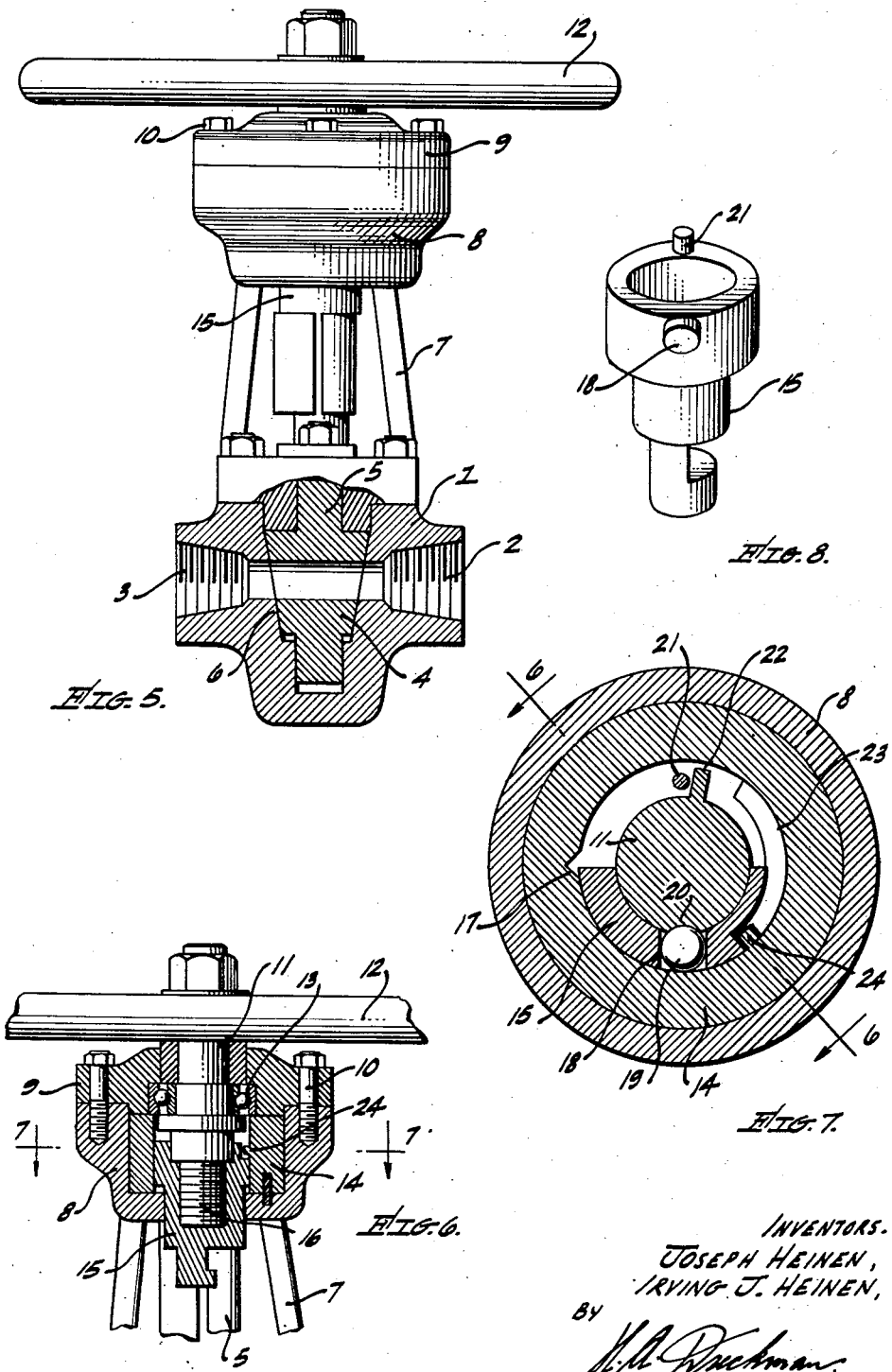

June 18, 1957
J. HEINEN ET AL
2,795,960
VALVE ACTUATING MEANS
Filed May 24, 1954
4 Sheets-Sheet 3
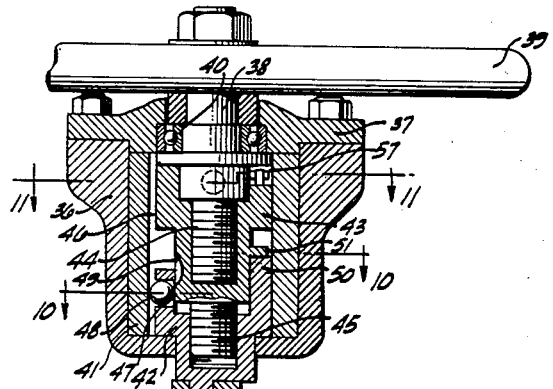
FIG. 9.
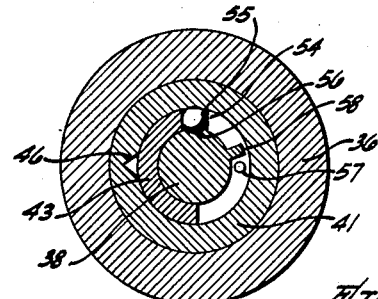
FIG. 11.
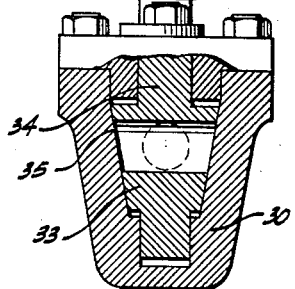
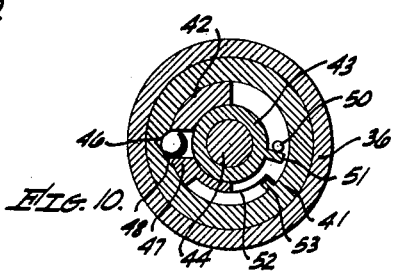
FIG. 10.
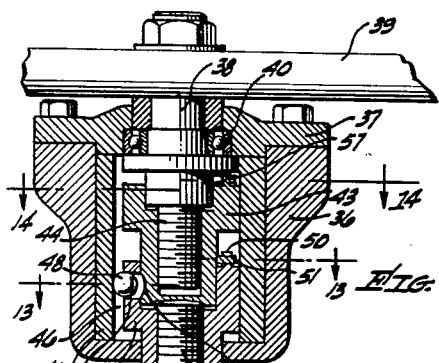
FIG. 12.
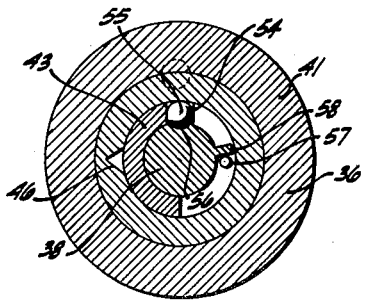
FIG. 14.
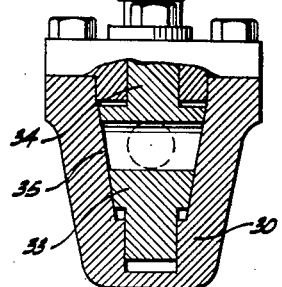
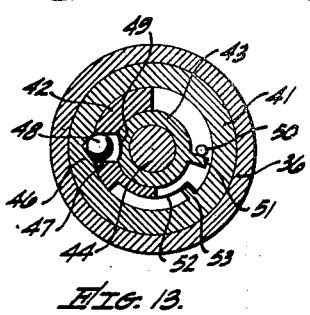
FIG. 13.
INVENTORS.
JOSEPH HEINEN,
IRVING J. HEINEN,
BY
ATTORNEY.

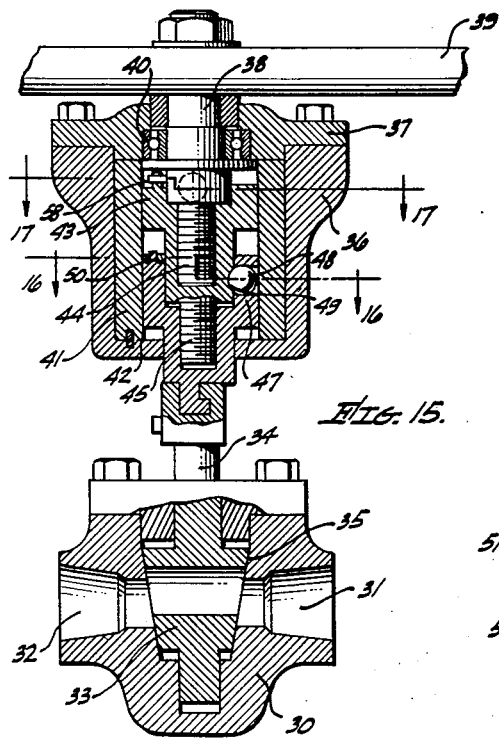
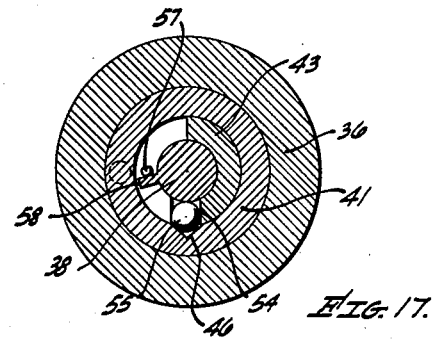
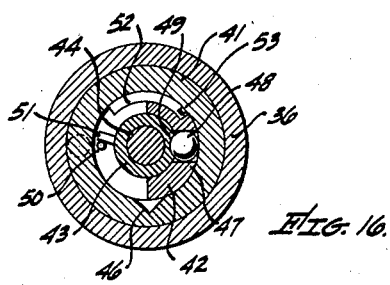
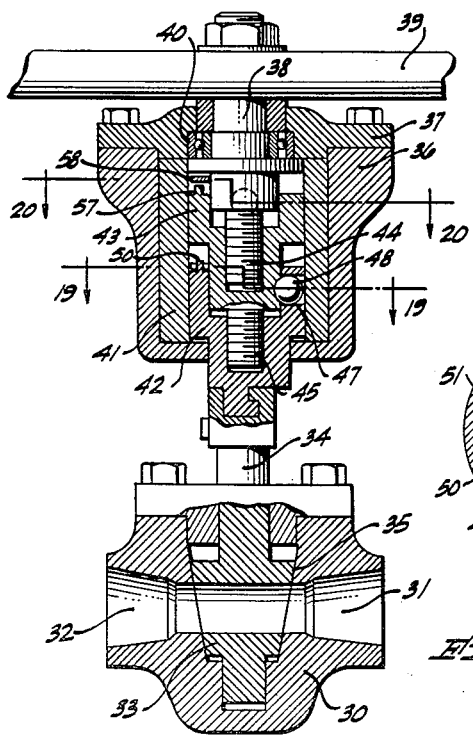
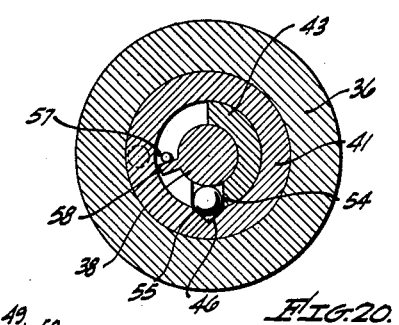
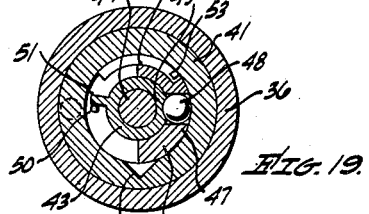

United States Patent Office 2,795,960
Patented June 18, 1957

2,795,960
VALVE ACTUATING MEANS

Joseph Heinen and Irving J. Heinen, Long Beach, Calif.

Application May 24, 1954, Serial No. 431,677

10 Claims. (Cl. 74—22)

This invention relates to a valve, and particularly a plug type of valve in which the plug is rotatable in the body of the valve, and in which a single actuating wheel will serve to unseat the plug and then rotate the same while moving the wheel in one direction.

An object of our invention is to provide a novel valve of the plug type in which rotation of the actuating wheel will first lift the plug off of its seat, and then rotate the plug from closed to open position, or vice versa.

Another object of our invention is to provide a novel means of attaching the operating stem to the valve so that rotation of the control wheel on the stem will not only raise and lower the plug in the valve, depending on direction of rotation of the wheel, but will also rotate the plug in the body of the valve.

Still another object of our invention is to provide a novel valve of the plug type, in which rotation of the control wheel in one direction will cause the plug to raise off of its seat, then rotate a partial revolution, and then reseat in the body of the valve, all during the continuous rotation of the control wheel in one direction.

Other objects, advantages and features of invention may appear from the accompanying drawing, the subjoined detailed description and the appended claims.

In the drawing—

Figure 1 is a longitudinal sectional view of our valve taken on the line 1—1 of Figure 2.

Figure 2 is a sectional view taken on line 2—2 of Figure 1.

Figure 3 is a longitudinal sectional view showing the valve parts in another position with the plug unseated.

Figure 4 is a sectional view taken on line 4—4 of Figure 3.

Figure 5 is a side elevation of our valve with the lower portion in section and showing the valve in open position.

Figure 6 is a fragmentary vertical sectional view of the upper part of the valve in still another position of the parts and as taken on line 6—6 of Figure 7.

Figure 7 is a sectional view taken on line 7—7 of Figure 6.

Figure 8 is a perspective view of the control sleeve.

Figure 9 is a longitudinal sectional view of a modified form of our valve.

Figure 10 is a sectional view taken on line 10—10 of Figure 9.

Figure 11 is a sectional view taken on line 11—11 of Figure 9.

Figure 12 is a longitudinal sectional view showing the valve parts in another position and with the plug unseated.

Figure 13 is a sectional view taken on line 13—13 of Figure 12.

Figure 14 is a sectional view taken on line 14—14 of Figure 12.

Figure 15 is a longitudinal sectional view of our valve in open position and with the plug raised.

Figure 16 is a sectional view taken on line 16—16 of Figure 15.

Figure 17 is a sectional view taken on line 17—17 of Figure 15.

Figure 18 is a longitudinal sectional view of our valve in open position and with the plug unseated.

Figure 19 is a sectional view taken on line 19—19 of Figure 18.

Figure 20 is a sectional view taken on line 20—20 of Figure 18.

Referring more particularly to the drawing, this invention is an improvement on a co-pending application, Serial No. 104,837, filed July 15, 1949, for "Plug Type Valve With Vertical Adjustment of Plug." The numeral 1 indicates a valve body which has intake and outlet ports 2—3 therein. A ported plug 4 is rotatably mounted in the body 1 and this plug includes a spindle 5 which rises vertically therefrom and projects upwardly through the bonnet 7. Suitable packing or sealing means is provided in the bonnet around the spindle 5, all of which is usual and well known in the art. The plug 4 is tapered and is mounted in a tapered seat 6 in the body 1. A bonnet 7 is mounted on the body 1, preferably by suitable bolts or studs. A cup 8 is fixedly formed on the upper end of the bonnet 7 and receives the various operating parts of the valve, as will be subsequently described. A cap 9 closes the upper or open end of the cup 8 and is bolted to the cup by means of suitable bolts or studs 10. A stem 11 extends through the cap 9 and into the cup 8. An operating wheel 12 is secured to the stem 11 in the usual manner, and this wheel serves to rotate the stem either clockwise or counter-clockwise, depending upon whether the valve is to be closed or opened. An annular bearing 13 within the cap 9 surrounds the stem 11 and serves to position the stem accurately within the cap 9 and the cup 8, and also permits this stem to rotate easily. A control ring 14 is nonrotatably mounted in the cup 8 and is pinned in position so that it will be immovable within the cup. A control sleeve 15 fits within the control ring 14 and projects downwardly through the bottom of the cup 8. The control sleeve 15 is detachably secured to the spindle 5 so that movement of the control sleeve will be imparted to the spindle 5 and thence to the plug 4. The lower end 16 of the stem 11 is threaded with left-hand threads and screws into a correspondingly threaded bore in the control sleeve 15. Thus, if the control sleeve 15 is held stationary and the stem 11 is rotated, the control sleeve will be moved vertically to thus raise or lower the plug 4 in its seat 6.

The means of rotating the stem 11 relative to the control sleeve 15, and also the means of partially rotating the control sleeve 15 on rotation of this stem 11, will now be described.

The control ring 14 is formed with a vertical groove 17 extending from top to bottom thereof. The control sleeve 15 is provided with a hole 18 in the side thereof. A ball 19 is fitted in the hole 18 and can move horizontally within the hole, in the manner to be subsequently described. The stem 11 is formed with a recess 20 in the side thereof and the ball 19 can move either into the recess 20 or into the vertical slot 17. The recess 20 is so positioned in the side of the stem 11 that when the stem is in its raised position relative to the control sleeve 15, that the ball 19 cannot drop into this recess. This position is shown in Figure 1. When the stem 11 is in its lowered position relative to the control sleeve, as shown in Figure 3, the ball 19 can move inwardly and project partly into the recess 20 and thus move out of the groove 17. This position is shown in Figure 4. A pin 21 rises from the upper surface of the control sleeve 15 and this pin is engageable by the finger 22 in certain positions of the control sleeve 15. The stem 11 does not move vertically within the cup 8 but the control sleeve 15 does move vertically when the threaded end 16 is rotated, thus causing the control sleeve to raise or lower on the threads of the part 16. An arcuate recess 23 is formed in the side of the control sleeve 15, and a pin 24 projects inwardly from the control ring 14 into this recess. The pin 24 thus acts as a stop and permits the control sleeve 15 to rotate approximately 90°.

In operation—assuming first that the valve is in closed position and the plug 4 is seated, as shown in Figure 1, that is, the plug 4 is in its lowered position, the wheel 12 is now rotated counterclockwise. Since the ball 19 extends partially into the groove 17 the control sleeve 15 will be prevented from rotating. The stem 11 rotating with the wheel 12 will, therefore, turn within the control sleeve 15 and the threads on the stem 16, being left-handed, will screw into the control sleeve and cause this sleeve to move upwardly. Upward movement of the control sleeve 15 will, therefore, lift the plug 4 and unseat the plug. The operation thus far described requires one complete revolution (360°) of the wheel 12. Upward movement of the control sleeve 15 has now moved the pin 21 into horizontal alignment with the finger 22. This finger now engages the pin 21 and rotates the control sleeve 15. The reason that the control sleeve can now rotate is because of the previously described upward movement of the sleeve. This movement has carried the ball 19 into alignment with the recess or indentation 20, as shown in Figure 4. This permits the ball 19 to drop inwardly out of the groove 17 and thus the control sleeve 15 can be rotated. The next quarter turn of the wheel 12 will, therefore, move the control sleeve 15, 90° and simultaneously will rotate the plug 4, 90° from closed to the open position shown in Figure 5. The pin 24, operating in the arcuate slot 23, limits the rotative movement of the control sleeve 15 to an angle of 90°.

When the valve is in the open position, as shown in Figure 5, it may be closed by the reverse rotation of the wheel 12, that is, clockwise and the action of the parts is just the reverse of that previously described. The structure previously recited is the preferred form of our invention, and the modified structure hereinafter described consists essentially of a means of seating a plug in a valve in both its open and closed position. In the valve heretofore described the plug is seated when closed and unseated when open.

In the modified form of our invention, shown in Figures 9 to 20, inclusive, a structure is shown quite similar to that previously described, except that there are two superimposed lift turn mechanisms mounted in the upper cup of the valve, these superimposed lift turn mechanisms serving to move the valve plug vertically off of its seat, then rotate the valve and then lower the plug onto its seat again, all by rotation of the control wheel in one direction. The numeral 30 indicates a valve body which has intake and outlet ports 31—32 therein. A ported plug 33 is rotatably mounted in the body 30 and this plug includes a spindle 34 which rises vertically therefrom and projects upwardly through the body 1. The spindle 34 is preferably an integral part of the plug 33, although it may be a separate attached part, if desired. Suitable packing or sealing means is provided in the bonnet 36 around the spindle 34, all of which is usual and well known in the art. The plug 33 is tapered and is mounted in a tapered seat 35 in the body 30. The bonnet and cup 36 is mounted on the body 30, preferably by suitable bolts or studs. The cup on the upper end of the bonnet assembly receives the various operating parts of the valve, that is, the lift turn mechanism. A cap 37 closes the upper or open end of the cup 36 and is bolted to the cup by suitable bolts or studs, as shown. A stem 38 extends through the cap 37 and into the cup 36. An operating wheel 39 is secured to the upper end of the stem 38 in the usual manner, and this wheel serves to rotate the stem either clockwise or counterclockwise, depending whether the valve 33 is to be moved to closed or open position. An annular bearing 40, within the cap 37, surrounds the stem 38 and serves to position this stem accurately within the cap 37, and also within the cup 36, and also permits this stem to rotate easily. A control ring 41 is nonrotatably mounted in the cup 36 and a pin extends between the cup and the control ring so that the ring will be immovable within the cup.

The two superimposed and interconnected lift turn mechanisms will be described, commencing with the lowermost mechanism. A control sleeve 42 fits within the control ring 41 and projects downwardly through the bottom of the cup 36. The control sleeve 42 is detachably secured to the spindle 34 so that movement (both rotary and vertical) of the control sleeve will be imparted to the spindle 34, and thence to the plug 33. A control coupling 43 is mounted within the ring 41 and also is moved vertically within the ring and is rotatably mounted, as will be subsequently described. The lower end 44 of the stem 38 is threaded with right-hand threads and screws into a correspondingly threaded bore in the control coupling 43. Thus, if the control coupling 43 is held stationary and the stem 38 is rotated, the control coupling will be moved vertically to thus raise or lower the control coupling 43. The lower end 45 of the control coupling 43 is threaded with left-hand threads and screws into a correspondingly threaded bore in the control sleeve 42. Thus if the control sleeve 42 is held stationary and the control coupling 43 is rotated, the control sleeve 42 will be moved vertically to thus raise or lower the plug 33 in its seat 35.

The means of rotating the stem 38 relative to the control coupling 43, and also the means of rotating the control coupling 43 relative to the control sleeve 42 will now be described. Furthermore, the means of partially rotating the control sleeve 42 on rotation of the control coupling 43 will also be described.

The control ring 41 is formed with a vertical groove 46 which extends from the top to the bottom thereof. The control sleeve 42 is formed with a hole 47 drilled through one side thereof. A ball 48 is fitted in the hole 47 and can move horizontally within the hole so as to engage the groove 46 in one position, or to engage the control coupling 43, as will be subsequently described. The control coupling 43 is formed with a recess 49 in the side thereof and the ball 48 can move either into the recess 49 or into the vertical slot 46, depending upon the relative positions of the control coupling 43 and control sleeve 42. The recess 49 is so positioned in the side of the control coupling that when this coupling is in its raised position relative to the control sleeve 42 that the ball cannot drop into this recess. This position is shown in Figure 9. When the control sleeve is in its raised position relative to the control coupling, as shown in Figure 12, the ball 48 can move inwardly and project partly into the recess 49 and thus move out of the groove 46. A pin 50 rises from the upper surface of the control sleeve 42 and this pin is engageable by the finger 51 in certain positions of the control sleeve. The finger 51 projects from the side of the control coupling 43. An arcuate recess 52 is formed in the side of the control sleeve 42 and a pin 53 projects inwardly from the ring 41 into this recess. The pin 53 thus acts as a stop and permits the control sleeve 42 to rotate approximately 90°.

The control coupling 43 is also provided with a hole 54 extending through the side thereof and a ball 55 fits in this hole. The ball 55 also extends into the groove 46 in certain positions of the control coupling 43 similar to the ball 48, previously described. The stem 38 is provided with a recess 56 into which the ball 55 extends in certain relative positions of the stem and the control coupling 43. A pin 57 rises from the upper surface of the control coupling 43 and this pin is engaged by a finger 58 extending from the side of the stem 38 when the control coupling is in a certain vertical position, thus causing the control coupling to be rotated by and when the stem 38 is rotated.

In operation and assuming first that the plug 33 is in closed position and the plug is seated, as shown in Figure 9, the hand wheel 39 is now rotated counterclockwise. Since the ball 48 extends partially into the groove 46 the control sleeve 42 will be prevented from rotating. The finger 58 is engaging the pin 57 and also the ball 55 is pressed into the recess 56, as shown in Figure 11, and consequently the control coupling 43 will rotate with the stem 38. The threads on the lower end 44 of the stem 38 are right-hand threads. The counterclockwise rotation will also rotate the control coupling 43 counterclockwise and the left-hand threads on the part 45 will cause the control sleeve 42 to move upwardly, thus unseating the plug 43. The ball 48 projecting from the control sleeve 42 is in the groove 46 permitting this vertical movement of the control sleeve. The wheel 39 is rotated approximately one full turn. At this point the control sleeve 42 has moved upwardly an amount sufficient to bring the pin 50 in position to be engaged by the finger 51, as shown in Figure 12. Further rotation of the wheel 39 now rotates the control sleeve 42 and, therefore, the plug 33. The plug 33 rotates approximately 90° as controlled by the arcuate recess 52 and the stop pin 53. This position is shown in Figure 15. The ball 48 has now been rotated to a position where it partly extends into the recess 49, thus nonrotatably coupling the control sleeve 42 and the control coupling 43, as shown in Figure 16. Since the control sleeve 42 is held against rotation by the pin 53 in this particular position, further counterclockwise rotation of the wheel 39 will now cause the threads on the member 44 to thread out of the control coupling 43, that is, the control coupling 43 will now be moved downwardly. This vertical movement of the control coupling 43 is permitted since the ball 55 is within the slot 46 so that the stem 38 is not coupled to the control coupling 43 as far as vertical movement is concerned. A full rotation of the wheel 39 thus moves the control coupling 43, the control sleeve 42, the spindle 34 and the plug 33 downwardly to again seat the valve, as shown in Figure 18. To close the valve the reverse action occurs with the wheel 39 rotating in a clockwise direction.

Having described our invention, we claim:

1. A lift turn mechanism including a rotatable element, a spindle rising from said rotatable element, a threaded means on the upper end of said spindle, a wheel stem threaded into said means, a ball mounted in said means, a control ring, said control ring having a vertical groove therein, said ball extending partly into said vertical groove permitting vertical movement of said spindle, a pin projecting upwardly from the spindle, a finger on said stem engageable with the pin to rotate said spindle, said stem having a recess in the side thereof into which the ball may move in one position of the spindle, a pin projecting upwardly from the spindle, a finger on said stem engageable with the pin to rotate said spindle.

2. A lift turn mechanism including a rotatable element, a cup mounted above the body, a spindle rising from said rotatable element, a control sleeve mounted in said cup and attached to the spindle, a threaded wheel stem, said control sleeve being threaded to receive the stem, a ball mounted in the side of the stem, said cup having a vertical groove therein into which the ball partly extends to permit vertical movement of the control sleeve, a pin projecting from the control sleeve, a finger on said stem engageable with the pin to rotate said control sleeve, said stem having a recess in the side thereof into which the ball may move in one position of the spindle.

3. A lift turn mechanism including a rotatable element, a cup mounted above the body, a spindle rising from said rotatable element, a control sleeve mounted in the cup, means attaching the control sleeve to the spindle, said control sleeve being threaded, a wheel stem threaded into the control sleeve, a control ring fixedly mounted in said cup, a ball mounted in the side of the control sleeve, said control ring having a vertical groove therein into which said ball partly extends, said stem having a recess in the side thereof into which said ball extends in one position of the control sleeve, said ball being free of the vertical groove when positioned within said recess, a pin rising from the control sleeve, and a finger projecting from the stem engageable with said pin to rotate the control sleeve.

4. A lift turn mechanism including a rotatable and vertically movable element, a spindle rising from said rotatable element, a wheel stem, a threaded means on the upper end of the spindle, a control coupling threaded into said means, said wheel stem being threaded into the control coupling, a ball mounted in said threaded means, a second ball mounted in the control coupling, vertically extending guide means engaged by either of said balls whereby said movable element is moved vertically, and means on said threaded means and said control coupling disengaging the balls from said guide means, a pin projecting from said control coupling, and a finger on said wheel stem engageable with said pin to rotate said rotatable element on rotation of the wheel stem.

5. A lift turn mechanism including a rotatable and vertically movable element, a spindle rising from said rotatable element, a wheel stem, a first lift turn means mounted on said stem, a second lift turn means mounted on said spindle, and means interconnecting said first and second lift turn means, whereby said movable element is rotated, raised and lowered on rotation of the stem in one direction, interengaging means on the stem and said first lift turn means whereby the first lift turn means is partly rotated, and another interengaging means on the second lift turn means and the spindle whereby the spindle and the rotatable element are partly rotated.

6. A lift turn mechanism including a rotatable and vertically movable element, a spindle rising from said rotatable element, a wheel stem, a threaded means on the upper end of the spindle, a control coupling threaded into said means, said wheel stem being threaded into the control coupling, vertically extending guide means engaged by said threaded means and said control coupling whereby said spindle is moved vertically, and means on said threaded means and said control coupling disengaging the threaded means and the control coupling from said guide means, interengaging means on the stem and said control coupling whereby the control coupling is partly rotated, another interengaging means on the threaded means and the control coupling whereby the spindle and the rotatable element are partly rotated.

7. A lift turn mechanism including a rotatable and vertically movable element, a spindle rising from said rotatable element, a wheel stem, a first lift turn means mounted on said stem, a second lift turn means mounted on said spindle, means threadedly interconnecting said first and second lift turn means, a ball in the second lift turn means and vertically extending guide means engaged by said ball to permit vertical movement of the rotatable element, interengaging means on the stem and said first lift turn means whereby the first lift turn means is partly rotated, and another interengaging means on the second lift turn means and the spindle whereby the spindle and the rotatable element are partly rotated.

8. A lift turn mechanism including a rotatable and vertically movable element, a spindle rising from said rotatable element, a wheel stem, a threaded means on the upper end of the spindle, a control coupling threaded into said means, said wheel stem being threaded into the control coupling, a ball mounted in said threaded means, a second ball mounted in the control coupling, vertically extending guide means engaged by either of said balls whereby said movable element is moved vertically, and means on said threaded means and said control coupling disengaging the balls from said guide means, interengaging means on the stem and said control coupling whereby the control coupling is partly rotated, another interengaging means on the threaded means and the control coupling whereby the spindle and the rotatable element are partly rotated.

9. A lift turn mechanism including a rotatable and vertically movable element, a spindle rising from said rotatable element, a wheel stem, a threaded means on the upper end of said spindle, a control coupling threaded into said means, said wheel stem being threaded into the control coupling, a ball mounted in said means, a second ball mounted in the control coupling, a control ring surrounding the control coupling and said means, said control ring having a vertical groove therein, said balls extending partly into said groove in certain positions of the means and the control coupling to permit vertical movement of said spindle, a pin projecting upwardly from said threaded means, a finger on the control coupling engageable with said pin to rotate said spindle.

10. A lift turn mechanism including a rotatable and vertically movable element, a spindle rising from said rotatable element, a wheel stem, a threaded means on the upper end of said spindle, a control coupling threaded into said means, said wheel stem being threaded into the control coupling, a ball mounted in said means, a second ball mounted in the control coupling, a control ring surrounding the control coupling and said means, said control ring having a vertical groove therein, said balls extending partly into said groove in certain positions of the means and the control coupling to permit vertical movement of said spindle, a pin projecting upwardly from said threaded means, a finger on the control coupling engageable with said pin to rotate said spindle, said control coupling having a recess in the side thereof into which the ball in the threaded means may move in one position of said means, and said stem having a recess in the side thereof into which the ball in the control coupling may move in one position of the control coupling.

References Cited in the file of this patent

UNITED STATES PATENTS

| | | |
|---|---|---|
| 1,864,596 | Jones | June 28, 1932 |
| 2,076,838 | Heggem | Apr. 13, 1937 |
| 2,238,385 | Foster | Apr. 15, 1941 |
| 2,392,880 | Reed | Jan. 15, 1946 |
| 2,408,223 | Nash | Sept. 24, 1946 |
| 2,490,173 | Swahnberg | Dec. 6, 1949 |
| 2,682,174 | Heinen | June 29, 1954 |

FOREIGN PATENTS

| | | |
|---|---|---|
| 667,127 | Great Britain | Feb. 27, 1952 |